United States Patent [19]
Kim

[11] Patent Number: 5,802,113
[45] Date of Patent: Sep. 1, 1998

[54] CLOCK SIGNAL RECOVERY SYSTEM FOR COMMUNICATION SYSTEMS USING QUADRATURE AMPLITUDE MODULATION

[75] Inventor: Beomsup Kim, Taijon, Rep. of Korea

[73] Assignee: Philips Electronics North America Corporation, New York, N.Y.

[21] Appl. No.: 592,219

[22] Filed: Jan. 26, 1996

Related U.S. Application Data

[60] Provisional application No. 60/007,054 Oct. 25, 1995.
[51] Int. Cl.$^6$ ................................................. H04L 27/22
[52] U.S. Cl. ........................... 375/326; 375/329; 375/359
[58] Field of Search .................... 375/359, 332, 375/329, 281, 261, 326, 355, 330, 225; 329/307, 304

[56] References Cited

U.S. PATENT DOCUMENTS

| | | | |
|---|---|---|---|
| 5,001,729 | 3/1991 | Tjahjadi et al. | 375/355 |
| 5,307,378 | 4/1994 | Norimatsu | 375/261 |
| 5,463,664 | 10/1995 | Nakaya | 375/331 |

*Primary Examiner*—Stephen Chin
*Assistant Examiner*—Betsy L. Deppe
*Attorney, Agent, or Firm*—Dicran Halajian

[57] ABSTRACT

A data communication receiver includes conventional means for receiving and demodulating a synchronous pulse amplitude modulated signal to provide baseband I and Q signals. A pair of absolute value generators process the baseband I and Q signals to provide absolute value I and Q signals which are combined to form a combined I and Q signal. The combined I and Q signal is applied to a third absolute value generator, the output of which is filtered by a baud rate or higher rate with a low order filter to produce a recovered clock signal.

13 Claims, 2 Drawing Sheets

CLOCK SIGNAL RECOVERY SYSTEM FOR COMMUNICATION SYSTEMS USING QUADRATURE AMPLITUDE MODULATION

RELATED APPLICATIONS

The present application claims the benefit of provisional application Ser. No. 60/007,054 filed Oct. 25, 1995, a copy of which is attached hereto as Appendix A.

FIELD OF THE INVENTION

This invention relates generally to communication systems using synchronous pulse amplitude modulation and particularly to clock signal recovery apparatus used therein.

BACKGROUND OF THE INVENTION

In the field of personal communications such as cellular telephone systems, substantial advances in the art have provided relatively reliable, high quality mobile or personal communication. In typical cellular systems, wireless communication is maintained between a great number of mobile units and a smaller number of facilities often referred to as "cells" which interface with conventional telephone land line networks. In related communication technology, satellite communication links provide additional communications systems and options.

As with all wireless transmission systems, personal communication operations such as cellular telephone systems or the like are limited as to available frequency "space". Thus, effective use of such limited frequency space requires that communication channel bandwidths be as narrow as practical for the intended use to provide a maximum number of available channels. In addition, efficient use of communication channels requires that the amount of information transmitted or fitted within each channel bandwidth be maximized. To increase the amount of information or data within a given channel bandwidth, transmission methods known generally as pulse amplitude modulation are often utilized. As the name implies, such modulation formats communicate data in the form of pulses having pulse amplitudes corresponding to one of system designated amplitudes. For example, modulation formats adopted by the Electronics Industry Association Interim Standard 54 and IS136 use a linear modulation technique known generally as differential phase shift keying, or DPSK. One variant of the adopted standard is known generally as pi over four quaternary phase shift keyed, or Π/4 QPSK. In addition, this standard utilizes square-root raised cosine filter with roll-off or Π/4 DQPSK (pi over four differential phase shift keying) of 0.35 and enjoys its principle advantage in bandwidth efficiency.

In systems operating within such modulation formats, I and Q signal components are modulated in quadrature upon a carrier for transmission. Quadrature modulation of the I and Q components is preferred due to its minimization of crosstalk or crosscoupling between the I and Q components and the ease with which the I and Q signal components may be subsequently separated. Within the receiver, the received signal is frequency converted to an intermediate frequency signal which is then synchronously detected to produce a baseband signal having the recovered I and Q components. A data detector then processes the baseband I and Q components to recover the data. The correct detection of data within the receiver requires the availability of a clock signal or timing signal corresponding in frequency and phase to the clock signal employed during data encoding by the transmitter. Since it is impractical in the face of limited channel bandwidth availability to separately transmit the clock signal, receivers generate a clock signal locally which is synchronized to the transmitter. A process generally referred to as clock signal recovery is used to extract clock signal information from the received signal which is then used as a timing signal to detect the encoded data synchronously. Because provision of a properly synchronized clock signal is a critical factor in data detection, extremely tight phase-locked loops responsive to the recovered clock information are operative upon the receiver clock.

As would be anticipated, considerable variety of clock signal recovery systems have been provided by practitioners in the art. For example, clock signal recovery has been implemented using either intermediate frequency or baseband signals. In addition, clock recovery systems may be generally described as either "data-aided" in which the data generated by the data detection system is utilized in the clock recovery process or "non data-aided" in which clock recovery is carried on independent of detected data.

As a general rule, data-aided clock recovery systems enjoy substantial advantages over non data-aided systems in providing recovered clock signals exhibiting substantially less signal jitter. However, data-aided clock recovery systems are subject to error accumulation problems and relatively slow clock signal recovery because it requires more computation. The latter problem arises in that the clock signal recovery system requires the output data from the data detection system to function while the data detection system requires recovered clock signals to perform its detection. In practice, this problem is met by utilizing slow initial acquisition cycles based on the use of known initial data sequences within the transmitted signal.

In contrast to the above, non data-aided clock signal recovery systems achieve fast clock signal recovery and are not subject to error accumulation problems exhibited by data-aided systems. However, non data-aided systems are subject to excessive clock signal jitter or phase noise. Since jitter in the recovered clock signal affects the error performance of the receiver directly in that the recovered clock signal is used to equalize the channel and to detect the data, such jitter must of necessity be minimized. Thus, present clock signal recovery systems whether data-aided or non data-aided result in substantial compromise of clock signal recovery effectiveness and reliability. There arises therefore a need in the art for a clock signal recovery system which achieves fast clock signal recovery and low jitter performance without being subject to error accumulation problems.

BACKGROUND OF THE INVENTION

Accordingly, it is a general object of the present invention to provide an improved clock signal recovery system. It is a more particular object of the present invention to provide an improved clock signal recovery system for use in communication systems utilizing synchronous pulse amplitude modulation. It is a still more particular object of the present invention to provide an improved clock signal recovery system having fast clock recovery and low jitter performance while avoiding error accumulation problems.

In accordance with the present invention, there is provided for use in a digital data communication system in which data is encoded in the form of periodic amplitude modulated pulses forming I and Q baseband signal components using a reference clock signal modulated upon a transmitted carrier and in which a receiver receives the transmitted carrier and recovers the baseband I and Q signals, a clock signal recovery system comprising: a first absolute value generator having an I signal component input for receiving the baseband I signal component, means for converting the I signal component to an absolute value I signal and an absolute value I signal output; a second absolute value generator having a Q signal component input for receiving the baseband Q signal component, means for converting the Q signal component to an absolute value Q signal and an absolute value Q signal output; combining means coupled to the absolute value I and Q signal outputs for combining the absolute value I signal and the absolute value Q signals to form a combined I and Q absolute value signal; a third absolute value generator coupled to the combining means for generating absolute values of the combined I and Q absolute value signal; and a clock signal filter having a passband corresponding to the frequency of the reference clock signal coupled to the third absolute value generator producing a filtered clock reference signal.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

DESCRIPTION OF THE PREFERRED EMBODIMENT

Figure 1:
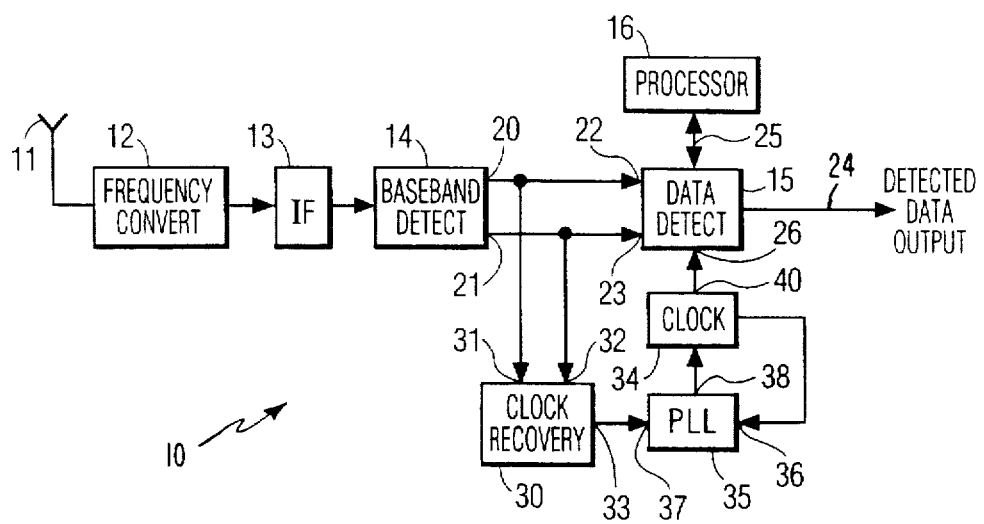
FIG. 1 sets forth a block diagram of a portion of a receiver within a digital communication system utilizing a clock signal recovery system constructed in accordance with the present invention.

FIG. 1 sets forth an illustrative digital communication system receiver utilizing the present invention clock recovery system and generally referenced by numeral 10. Receiver 10 includes a receiving antenna 11 coupled to a conventional frequency converting system 12, the output of which is coupled to an intermediate frequency amplifying and filtering circuit 13. A baseband signal detector 14 is coupled to intermediate frequency circuit 13 and includes an I signal output 20 and a Q signal output 21. A data detector 15 includes baseband inputs 22 and 23 coupled to outputs 20 and 21 respectively of baseband detector 14 and a detected data output 24. A processor 16 which may be constructed in accordance with conventional fabrication techniques is operatively coupled to data detector 15 by a bidirectional coupling 25.

A clock recovery system 30, constructed in accordance with the present invention and described below in greater detail, includes respective I and Q signal inputs 31 and 32 coupled to the outputs of baseband detector 14 and a recovered clock signal output 33. A receiver clock 34 constructed in accordance with conventional fabrication techniques includes an output 40 providing clock signals to clock input 26 of data detector 15. A conventional phase-locked loop 35 includes a clock signal input 36 coupled to clock 34 and a clock reference signal input 37 coupled to output 33 of clock recovery circuit 30. Output 38 of phase-locked loop 35 is coupled to clock 34 to complete the phase-locked loop coupling operative upon clock 34.

In operation, antenna 11, frequency converter 12, intermediate frequency filter 13 and baseband detector 14 operate in accordance with conventional techniques in which a transmitted data communication signal received by antenna 11 is converted by frequency converter 12 to an intermediate frequency signal corresponding to the passband frequency of intermediate frequency amplifier 13. Intermediate frequency filter 13 excludes undesired harmonics and interfering signals and couples the filtered intermediate frequency signal to baseband detector 14. Baseband detector 14 utilizes conventional demodulation techniques, such as synchronous detection, to recover the respective baseband I and Q signal components from the intermediate frequency signal and provides baseband I and Q signal inputs to data detector 15.

In further accordance with conventional fabrication techniques, the signal received at antenna 11 includes a carrier signal modulated in accordance with a synchronous pulse amplitude modulation. As is described above, such modulation systems are well known and, while they differ somewhat in format, are similar in their use of periodic data pulses having amplitudes modulated within predetermined amplitude levels to communicate data in a more efficient manner. In the present invention system described below, it will be assumed that the type of synchronous pulse amplitude modulation utilized is that known as Π/4 QPSK or Π/4 DQPSK modulation. Thus, data detector 15 operates in response to processor 16 and locally generated clock signals provided by clock 34 to detect the modulated data and provide detected data at output 24.

As mentioned above, the proper operation of the data detector within synchronous pulse amplitude modulation systems such as Π/4 QPSK or Π/4 DQPSK requires that the data detector be supplied with a local clock signal which is synchronized in both phase and frequency to the clock signal utilized in coding the data at the transmitter. To provide this phase and frequency synchronization, phase-locked loop 35 operates in response to a sample of the local clock signal produced by clock 34 and a reference signal input at input 37 recovered by clock recovery system 30. While a variety of phase-locked loop systems may be utilized to synchronize clock 34, all basically require a reference signal reliably related to the transmitter clock signal to control the local clock circuit within the receiver.

In accordance with the present invention, clock recovery circuit 30 fulfills this critical requirement in a novel and inventive manner. The operation of clock recovery system 30 is set forth below in greater detail. However, suffice it to note here that clock recovery system 30 receives baseband I and Q input signals from baseband detector 14 and produces an output signal at output 33 which comprises the recovered reference clock signal to be used in controlling phase-locked loop 35. It should be noted that clock recovery system 30 is a baseband recovery system in that it utilizes baseband I and Q signals. It should be further noted that clock recovery system 30 is a non dataaided system in that it operates without utilization of the detected data recovered by data detector 15. As a result, clock recovery system 30 does not exhibit the slow initial acquisition cycle and tendency toward error accumulation which have plagued data-aided systems. In contrast to prior art non data-aided systems, however, clock recovery system 30 provides the superior clock signal jitter performance characteristic of data-aided systems which has heretofore been unobtainable in non data-aided clock recovery systems.

Figure 2:
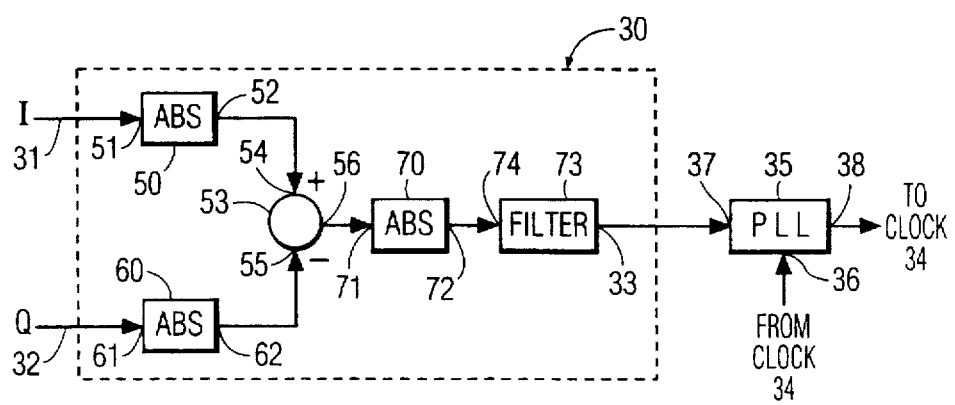
FIG. 2 sets forth a block diagram of the present invention clock signal recovery system.

FIG. 2 sets forth a block diagram of the present invention clock recovery system generally referenced in FIG. 1 by numeral 30. As described above in conjunction with FIG. 1, clock recovery system 30 includes respective I and Q signal inputs 31 and 32 and outputs a recovered clock signal output 33. An absolute value generator 50 includes an input 51 coupled to I signal input 31 and an output 52. A second absolute value generator 60 includes an input 61 coupled to Q signal input 32 and an output 62. A combining network 53 includes an additive input 54 coupled to I signal output 52 and a subtractive input 55 coupled to Q signal output 62. Combining network 53 combines the absolute value outputs of generators 50 and 60 to produce a combined output 56 which represents a difference between the I signal output 52 and the Q signal output 62 which is applied to an input 71 of a third absolute value generator 70. Generator 70 includes an output 72 coupled to input 74 of a filter 73. Filter 73 includes a filtered signal output 33 which is coupled to input 37 of phase-locked loop 35 in the manner described above. It should also be recalled that phase-locked loop 35 receives a sample clock signal from clock 34 at input 36 and produces a clock control signal at output 38 which is applied to clock 34 in the manner shown in FIG. 1.

In operation, the baseband I and Q signals at inputs 31 and 32 are converted to absolute value I and Q signals by absolute value generators 50 and 60 and applied to summing network 53. In accordance with an important aspect of the present invention, the use of absolute value generators 50 and 60 rather than squaring circuits used in prior art systems provides substantially lower signal distortion and substantial saving of computation required by the system processor. The absolute value I and Q signals combined within summing network 53 are subjected to a further absolute value computation within absolute value generator 70. In accordance with an important aspect of the present invention, the use of a third absolute value generator 70 operative upon the combined I and Q absolute value signals further lowers the signal distortion. The combined I and Q absolute value signal is then filtered by filter 73. Filter 73 fulfills the function of clock filtering within clock recovery circuit 30 and substantially excludes undesired harmonics and signal components while emphasizing the recovered clock signal. In its preferred form, filter 73 comprises a baud rate or higher rate with a low order filter functioning to select the clock signal frequency components from the absolute value signal generated by generator 70 which forms the recovered reference clock signal for use by phase-locked loop 35.

Figure 3:
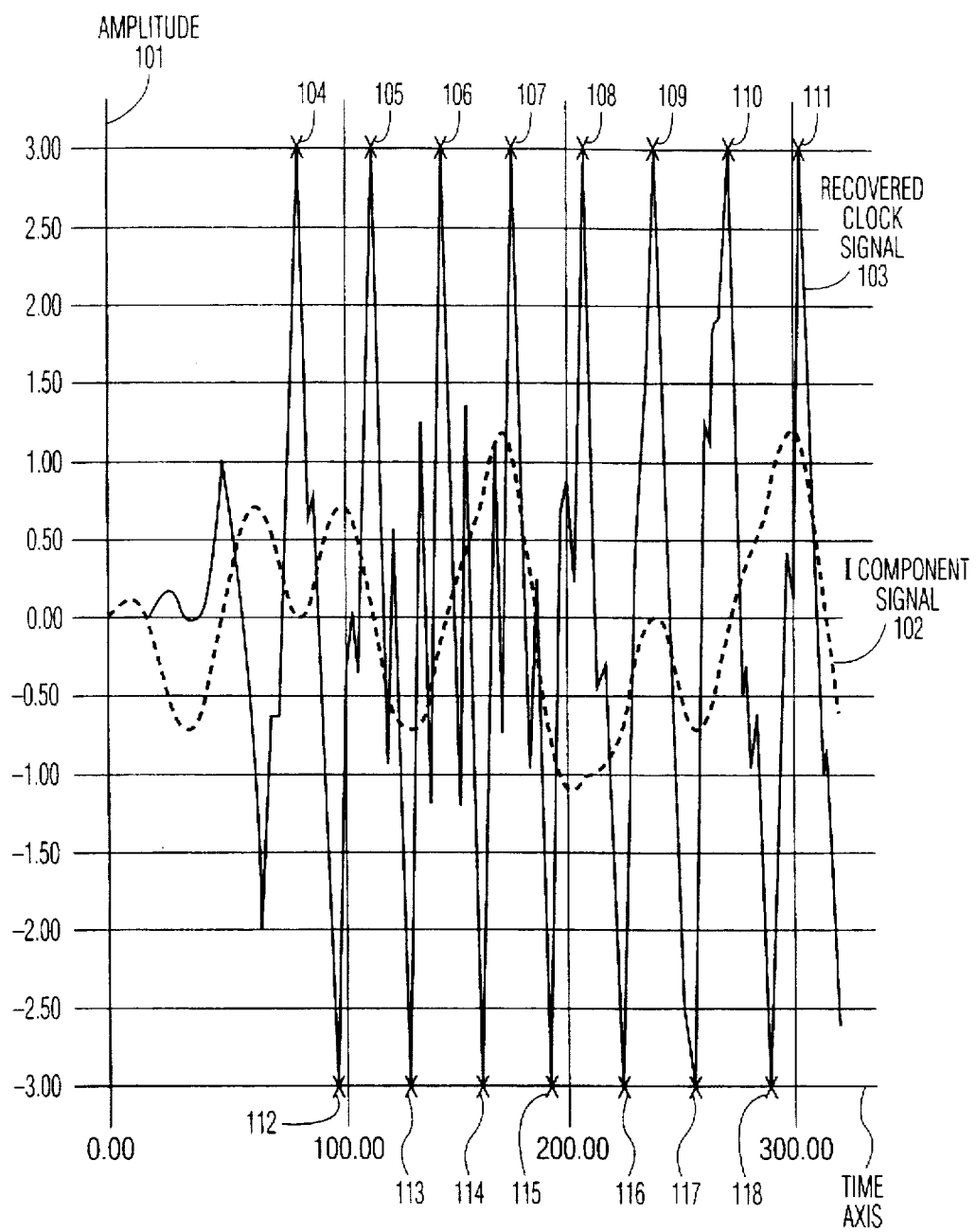
FIG. 3 sets forth a graphical representation of a typical recovered clock signal utilizing the present invention clock signal recovery system.

FIG. 3 sets forth a graphical representation of a typical recovered clock signal utilizing the present invention clock signal recovery system as it would appear at output 33 of filter 73 (seen in FIG. 2). FIG. 3 displays relative amplitude along vertical axis 101 and time along horizontal axis 100. For purposes of comparison and illustration, a typical baseband I component signal is shown as dashed-line curve 102. The corresponding recovered clock reference signal provided by the above-described present invention clock signal recovery system is shown as solid-line curve 103. As can be seen, the signal waveform of curve 103 defines a plurality of positive going peaks 104 through 111 which are generally evenly spaced in time and relatively constant in amplitude. Further, the signal waveform of curve 103 defines a plurality of negative going peaks 112 through 118 interleaved or interspaced between positive going peaks 104 through 111 which are also substantially equally spaced in time and which also define relatively constant peak amplitudes. The relatively even time intervals between peaks of the recovered clock signal provide periodic reliable reference information for use by the phase-locked loop controlling the local clock signal. The stable consistent amplitudes of the signal peaks also ensure that undesired phase errors will not be introduced onto the phase-locked loop reference signal.

Thus, it will be apparent to those skilled in the art that the present invention clock recovery system provides a recovered reference clock signal which defines peak portions which may readily be used to synchronize the receiver clock phase-locked loop. It will be equally apparent to those skilled in the art that the present invention clock signal recovery system provides the advantages of both data-aided and non data-aided systems while avoiding their disadvantages. As a result, the system compromises previously required are avoided.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. For use in a digital data communication system in which data is encoded in the form of periodic amplitude modulated pulses forming I and Q baseband signal components using a reference clock signal modulated upon a transmitted carrier and in which a receiver receives the transmitted carrier and recovers the baseband I and Q signals, a clock signal recovery system comprising:

a first absolute value generator having an I signal component input for receiving said baseband I signal component, means for converting said I signal component to an absolute value I signal and an absolute value I signal output;

a second absolute value generator having a Q signal component input for receiving said baseband Q signal component, means for converting said Q signal component to an absolute value Q signal and an absolute value Q signal output;

combining means coupled to said absolute value I and Q signal outputs for subtracting said absolute value Q signal from said absolute value I signals to form a combined I and Q absolute value signal;

a third absolute value generator coupled to said combining means for generating absolute values of said combined I and Q absolute value signal; and a clock signal filter having a passband corresponding to the frequency of said reference clock signal coupled to said third absolute value generator producing a filtered clock reference signal.

2. A clock signal recovery system as set forth in claim 1 wherein said clock signal filter is a baud rate filter.

3. A clock signal recovery system as set forth in claim 2 wherein said data is modulated upon said transmitted carrier as a Π/4 QPSK modulated signal.

4. A clock signal recovery system as set forth in claim 3 wherein said filtered clock reference signal of said clock signal filter defines a plurality of substantially periodic amplitude peaks at a frequency equal to said reference clock signal.

5. In a digital communication system operative between a transmitter and a receiver using synchronous pulse amplitude modulation controlled by a transmitter reference clock to encode data in the form of a baseband signal having a pair of phase-separated baseband signal components, clock signal recovery means operative within said receiver comprising:

first and second absolute value generators responsive to said pair of phase-separated baseband signal components to produce first and second absolute value baseband signals;

means for subtracting said first absolute value baseband signal from said second absolute value baseband signal to form a combined signal;

a third absolute value generator, coupled to said means for combining, for producing a combined absolute value baseband signal; and a filter coupled to said third absolute value generator to produce a filtered clock reference signal.

6. Clock signal recovery means as set forth in claim 5 wherein said synchronous pulse amplitude modulation is Π/4 QPSK modulation and wherein said pair of phase-separated baseband signals are quadrature phased I and Q signals.

7. Clock signal recovery means as set forth in claim 6 wherein said filter includes a baud rate filter having a passband frequency generally centered at the frequency of said transmitter reference clock.

8. A method for recovering a clock signal operative within a data communication receiver receiving a transmitted signal having Π/4 QPSK modulated I and Q baseband signal components, said method comprising the steps of:

providing I and Q baseband signal components in response to said transmitted signal;

generating an absolute value I signal in response to said I baseband signal;

generating an absolute value Q signal in response to said Q baseband signal;

subtracting said absolute value Q signal from said absolute value I signal to form a combined signal;

generating a combined absolute value of said combined signal;

filtering said combined absolute value signal to form a signal having periodic peak amplitudes; and utilizing said peak amplitudes to control generation of a receiver clock signal.

9. A clock signal recovery system for recovering a clock signal operative within a data communication receiver receiving a transmitted signal having Π/4 QPSK modulated I and Q baseband signal components, said clock signal recovery system comprising:

means for providing I and Q baseband signal components in response to said transmitted signal;

means for generating an absolute value I signal in response to said I baseband signal;

means for generating an absolute value Q signal in response to said Q baseband signal;

means for subtracting said absolute value Q signal from said absolute value I signal to form a combined signal;

means for generating a combined absolute value of said combined signal;

means for filtering said combined absolute value signal to form a signal having periodic peak amplitudes; and means for utilizing said peak amplitudes to control generation of a receiver clock signal.

10. A clock signal recovery system as set forth in claim 1 wherein said clock signal filter is a high rate filter with a low order filter.

11. A clock signal recovery system as set forth in claim 2 wherein said clock signal data is modulated upon said transmitted carrier as a Π/4 DQPSK modulated signal.

12. A method for recovering a clock signal operative within a data communication receiver receiving a transmitted signal having Π/4 DQPSK modulated I and Q baseband signal components, said method comprising the steps of:

providing I and Q baseband signal components in response to said transmitted signal;

generating an absolute value I signal in response to said I baseband signal;

generating an absolute value Q signal in response to said Q baseband signal;

subtracting said absolute value Q signal from said absolute value I signal to form a combined signal;

generating a combined absolute value of said combined signal;

filtering said combined absolute value signal to form a signal having periodic peak amplitudes; and utilizing said peak amplitudes to control generation of a receiver clock signal.

13. Clock signal recovery means as set forth in claim 5 wherein said synchronous pulse amplitude modulation is Π/4 DQPSK modulation and wherein said pair of phase-separated baseband signals are quadrature phased I and Q signals.

* * * * *